E. SIEGEL.
VEHICLE ROUTE INDICATOR DEVICE.
APPLICATION FILED OCT. 30, 1919.

1,350,244. Patented Aug. 17, 1920.
2 SHEETS—SHEET 1.

WITNESSES
Frederick Diehl.
E. B. Gale.

INVENTOR
EDWARD SIEGEL.
BY
ATTORNEYS

E. SIEGEL.
VEHICLE ROUTE INDICATOR DEVICE.
APPLICATION FILED OCT. 30, 1919.
1,350,244.
Patented Aug. 17, 1920.
2 SHEETS—SHEET 2.
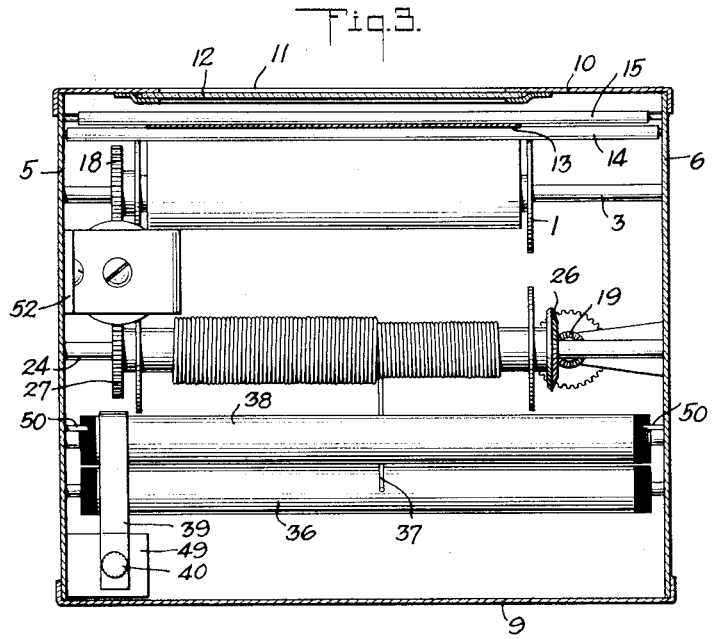
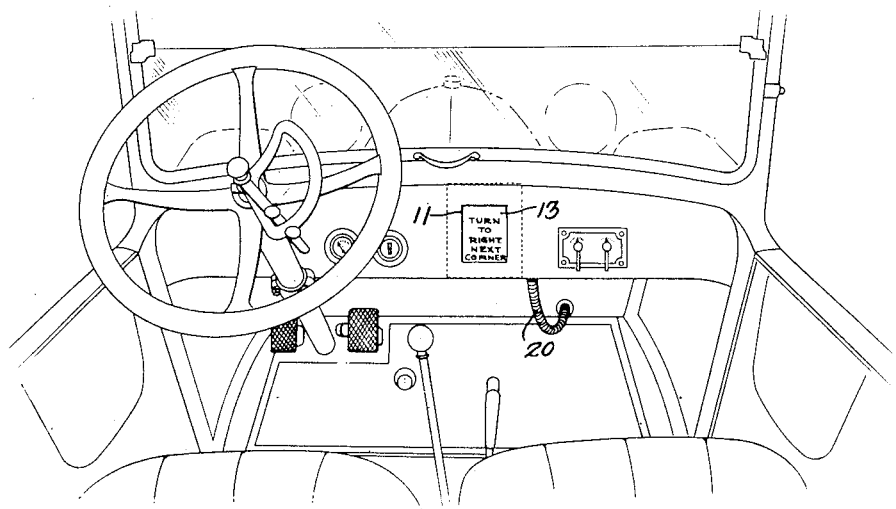
WITNESSES
Frederick Diehl.
E. B. Gale
INVENTOR
EDWARD SIEGEL.
BY Munn & Co.
ATTORNEYS

UNITED STATES PATENT OFFICE.

EDWARD SIEGEL, OF ELMHURST, NEW YORK.

VEHICLE-ROUTE-INDICATOR DEVICE.

1,350,244.  Specification of Letters Patent.  Patented Aug. 17, 1920.

Application filed October 30, 1919. Serial No. 334,479.

*To all whom it may concern:*

Be it known that I, EDWARD SIEGEL, a citizen of the United States, and resident of Elmhurst, borough of Queens, county of Queens, and State of New York, have invented a new and Improved Vehicle-Route-Indicator Device, of which the following is a full, clear, and exact description.

This invention relates generally to a vehicle route indicating device, of the type in which a traveling tape or other movable member is carried past an opening to give the desired directions and information relative to a particular route of travel.

In devices heretofore employed for this purpose, there has been provided a continuously movable member whose movement is governed by the travel of the vehicle, the said member having directions thereon by which the driver is supposed to be guided. In such devices it has been found difficult to identify the land marks, and to properly synchronize the movement of the direction tape with the land marks as they appear, due to the relatively slow movement of the traveling member, which is required in such devices, in order to accommodate the directional tapes for relatively long distances. Further, in certain route indicators heretofore employed, it has oft times been found that the desired direction is not given until the moment at which a land or road mark has been reached, or passed, there being no forwarning of the desired mark immediately prior the approach to the same.

One of the objects of this invention is to provide a route director or road indicator which will overcome the objections above noted, by providing a mechanism having directions thereon controlled so that its movements will be intermittent and so synchronized relative to the land or road marks, that the same will appear before the approach to the same, to give the driver ample notice of the proper directions.

A further object of this invention is to provide a route indicator having a direction tape having a relatively fast movement whereby preliminary warning may be given to the driver upon the approach to a road or land mark, and the desired directions given, on a relatively large scale, sketch or map displayed to properly guide the driver.

A further object of this invention is to provide a route indicating device having a relative slow moving member continuously actuated, and dependent for its movement upon the travel of the vehicle, and another mechanism having a relatively fast intermittent movement which controls the time at which certain directions are brought to view.

A further object of this invention is to provide in a route indicator comprising a continuously movable member, and an intermittently movable member, a means for effectively controlling the movement of the intermittently movable member.

A further object of this invention is to provide in a road indicator, a means whereby road directions and land marks over a relatively great distance may be provided in a compact space, the mechanism being so arranged that the road characteristics or land marks may be shown upon a relatively large scale, and before the said marks are actually reached whereby the driver will have ample warning of same. It is to be understood that the indicator may give the necessary directions on intermittently movable members by various means, either by maps, sketches, special marks, printed directions, or the like, this invention not being limited to either one of the same.

A further object of this invention is to provide in a route indicator, comprising a relatively slow continuously movable member, and a relatively fast intermittently movable member, an electromagnetic means for controlling the movement of the latter.

In the practical embodiment shown, the above objects are accomplished by providing a relatively slow continuously movable mechanism dependent for its movement upon the travel of the vehicle, the said mechanism including a plurality of spools, having an element, preferably insulated wire, wound thereon and so arranged that in passing from one spool to the other, uninsulated portions of the wire will establish a circuit for actuating electromagnetic means whereby a driving connection will be established between other rolls or spools on which is wound a tape having directions or routing marks thereon, the said tape being so arranged as to be visible through an opening. By such an arrangement, the direction or routing tape is moved relatively fast at intermittent intervals, which are determined by the position and arrangement of the uninsulated portions of the relatively slow moving element, which in turn determines the time at which the electromagnetic clutching mechanism becomes operative. It is to be understood however that this invention is not limited to the clutching mechanism shown, or to the means shown for controlling the movement thereof. It is the intention to cover broadly, a direction indicator having a relatively slow continuously movable member, which determines or controls the movement of another relatively fast intermittently movable mechanism.

Other objects and advantages will be apparent from the following description and the accompanying drawings showing a practical embodiment of the invention, and in which similar characters of reference designate corresponding parts in the several views.

Fig. 3 is an end elevation view partly in section looking in the direction of the arrows and taken on the line 3—3 of Fig. 2.

Fig. 4 is a perspective view showing an arrangement in which the direction or guiding tape is visible at the instrument board, and showing a flexible driving connection leading from the indicator to the wheel of the automobile.

Figure 1:
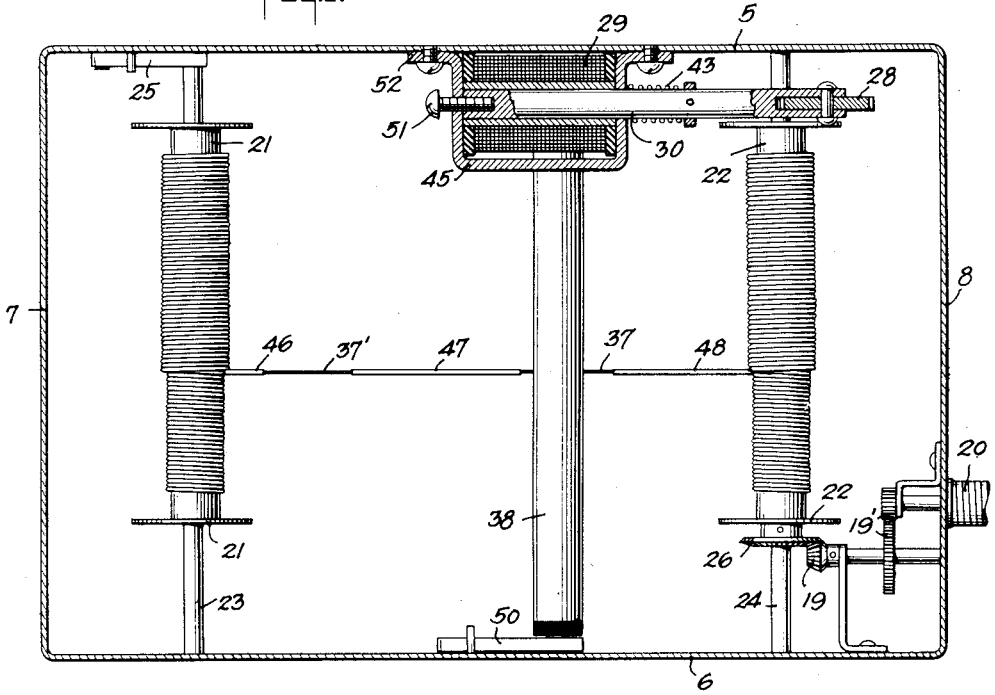
Figure 1 is a plan view looking in the direction of the arrows and taken on the line 1—1 of Fig. 2, showing the casing and magnet in section, and part of the clutching mechanism broken away.

Referring to the drawings showing a practical embodiment of the invention, the route or direction indicator comprises a direction indicating means or mechanism, shown as including a plurality of spools 1 and 2 rotatably supported in any suitable manner as for instance upon shafts 3 and 4 carried in the sides 5 and 6 of a casing or box which may be of any suitable form and construction. In the form shown, the casing is provided with end portions 7 and 8 connecting the sides 5 and 6, a bottom 9, and a top 10 having an opening 11 therein, and a suitable transparent covering 12 therefor, the purpose of which will later appear. The direction indicating means further includes a tape 13 or other suitable member upon which may be printed or arranged the desired information embodying the directions for the driver, which may be in the form of printed instructions, marks, maps, sketches or the like. The tape is wound upon one of the spools as for instance 2, is carried past the opening 11, so that the information thereon may be visible through the opening, the other end of the tape being carried to the other spool 1, upon which it is wound. Any suitable means may be provided in order to maintain that portion of the tape 13 in a taut position, which is visible through the opening 11, as for example, a pair of rods arranged on the opposite sides of the opening 11, each pair including a stationary rod 14, and another spring pressed rod 15, the spring 16 being shown, for maintaining a slight pressure upon the tape 13 which passes between the rods 14 and 15. As a further means of preventing the tape 13 from sagging or becoming wrinkled, a suitable means such as a spring 17 exerts a dragging effect upon the spool 2, but it is understood that any suitable tensioning means may be provided. In order to move the tape 13, a suitable means is provided for moving the spool 1, and for this purpose a gear 18 is shown connected with the spool 1 to move therewith. By the use of a mechanism later to be described, the tape 13 may be moved intermittently for varying periods of time by a suitable driving connection from a continuously movable member 19 which may be driven through a suitable flexible driving connection 20 from the wheel of the automobile, in a manner well known in the art.

In the form shown, there is employed a master control mechanism including a plurality of spools 21—22 carried on shafts 23 and 24 respectively, and rotatably supported in the sides 5 and 6 of the box. A spring 25 is employed to restrain the free movement of the spool 21, and thus afford a dragging effort in a similar manner to that already described in connection with the direction tape. The spool 22, is continuously actuated through a gear 26 mounted on the shaft 24, which engages the pinion or member 19 the movement of which is dependent upon the travel of the vehicle. In the form shown, another gear 27 is mounted to rotate with the shaft 24, and through another idler gear 28 engages the gear 18 whereby the tape 13 is moved. Any suitable gearing ratio may be employed, but preferably, the gearing is to be of such a ratio so that the spool 1 controlling the movement of the tape 13 will have a relatively fast movement as compared with that of the spool 22 which determines the speed of the master control device.

Further, the difference in speed between the master control device, and the tape 13, may be varied to suit different conditions.

Figure 2:
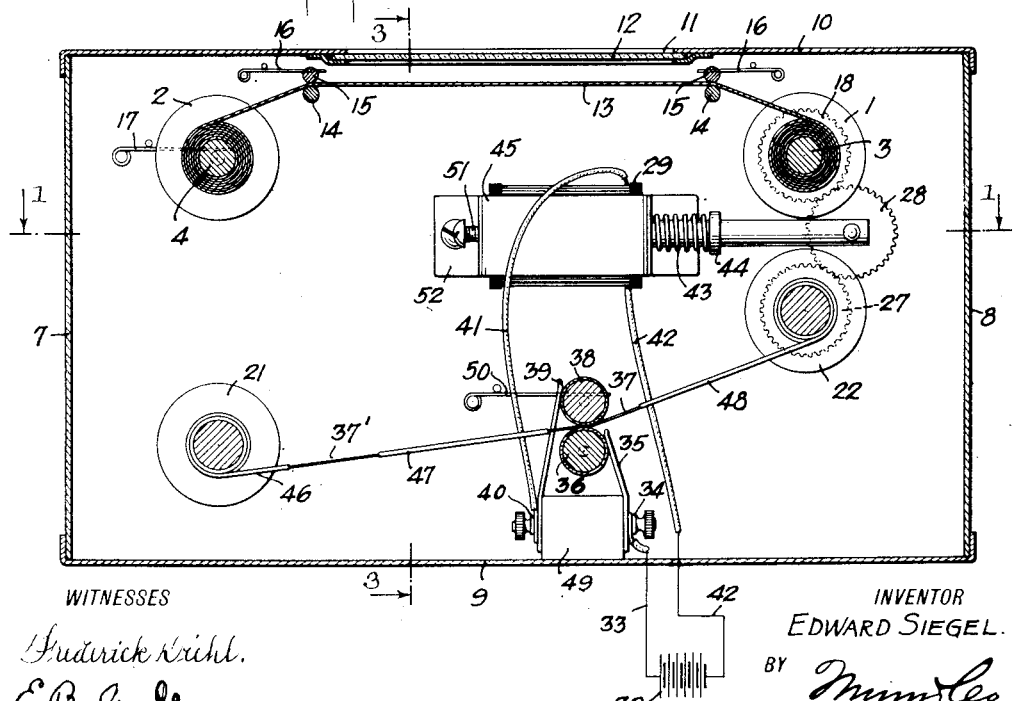
Fig. 2 is an elevation view partly in section, showing the relative arrangement of the mechanism, and the direction tape carried by an opening through which it is visible.

As a means of obtaining intermittent movement of the tape 13, in the form shown, an electroresponsive means including a magnet 29 controlling the movement of an armature or core 30, is provided to intermittently establish a driving connection between the continuously movable member 19 through proper gearing connecting mechanism. In the form shown, the idler gear 28 is arranged relative to the core 30, so as to be actuated by the movement thereof, so that the said gear 28 may be moved either into or out of mesh with the other gears 18 and 27 respectively. The gear 27 may be continuously in motion, but unless the idler gear 28 meshes with two gears 27 and 18, the tape 13 will remain stationary. As shown in Fig. 2, a circuit for the magnet 29 comprises a source of power such as a battery 32, conductor 33, binding post 34, the contact finger 35. The roller 36, conductor 37, roller 38, and another contact finger 39, binding post 40, conductor 41 through the winding magnet 29, to conductor 42. As shown in this position, the magnet is energized, and attracts the core or armature 30 against the pressure of a spring 43, which is arranged between a shoulder 44 on the core 30, and a bracket 45 which holds the magnet in proper position. When the core is attracted, the gear 28 is moved to establish a driving connection to the gear 18, to move the tape 13. When the circuit for the magnet is broken, the pressure of the spring 43 acting against the shoulder 44, will cause the driving connection for the spool 1 to be broken, thus permitting the tape 13 to come to rest. It is to be understood however that this invention is not to be limited to the means shown herein for intermittently establishing a driving connection to move the tape 13, but any suitable means well known in the art may be employed for this purpose.

In order to intermittently establish a driving connection to move the tape 13 for varying periods, a master control means is employed for governing or controlling the periods through which the magnet 29, is energized. Various devices may be used for this purpose, but in the preferred form shown, a flexible conductor 37 is employed, the said conductor being wound upon one of the spools 21, one end being guided between the roller contacts 36—38, and the end thereof connected to the other spool 22 which is adapted to be continuously driven from the member 19 when the vehicle is in motion, so that the flexible conductor 37 will be wound thereon. The conductor 37 is provided with insulated portions 46—47— and 48 which are distributed throughout the length thereof, which will thus present portions of the conductor such as 37 and 37', which will complete the circuit for the magnet as the said portions pass between the roller contacts 36, 38. A driving connection will be established to move the tape 13 at periods corresponding to the time it takes for the uninsulated portion of the conductor to pass between the roller contacts 36 and 38, and the driving connection for the tape 13 will be broken, through periods corresponding to the insulated portions of the flexible conductor wound upon the spools 21 and 22 respectively. It is here to be noted that if the speed ratio between the movement of the master control device, and the mechanism actuating the tape, is such that the tape moves at relatively fast speed, in order that the tape 13 may move a certain distance, as for instance the length of the opening 11, it would only be necessary that a relatively small length of the flexible conductor be uninsulated to effect such a movement. For example, if the length of the opening 11, were 4 inches, and the speed ratio between the spools 22 and 18 were 1 to 4 respectively, the uninsulated portion of the conductor need only be for a distance of about 1 inch. Of course it is understood that there may be a slight difference due to the amount of tape upon spool 18, but such a difference may be readily compensated for by making a corresponding allowance in the length of the uninsulated portion of the conductor 37. Preferably, a wire is used as the flexible conductor, the advantage of such an element being that a relatively great length of wire may be wound upon the spool, and occupies a minimum of space. Further, by employing cylindrical roller contacts 36 and 38 with the metal surface therefore, the wire may readily move longitudinally of the axis of the spools, without interfering with the means of establishing the circuit for the magnet 29. It is thus seen that it is desirable to have the axis of the cylindrical roller contacts extending longitudinally and substantially parallel with the axis of the spools 21 and 22, and to have the length of the said rollers at least equal to the length of that portion of the spool upon which the flexible element is wound. The terminals 34 and 40 and the contact fingers 35 and 39, may be mounted upon a terminal block 49 made of suitable insulating material. A spring finger 50 may be arranged in any suitable manner to exert a pressure upon one of the rollers 38, to insure a contact between the rollers, and the conductor 37 passing therethrough.

With reference to the electroresponsive means for intermittently establishing the driving connection for the tape, in the form shown, the core or armature 30 extends inward in the solenoid or magnet 29, and is provided with a suitable means such as a screw 51 extending through the casing 52 for the magnet, the head of the screw extending outward from the casing and being spaced therefrom a suitable distance so that the movement of the core and the gear 28 connected thereto, will be limited. The casing is preferably connected to one side 5 of the box in order to properly support the electroresponsive means.

In operation, the master control means will first have to be made in accordance with the road or land marks, and the directions which it is desired to give to the driver. That is, if it is desired to call the drivers attention to a turn in the road about to be reached, a portion of the flexible conductor would be uninsulated, so as to establish the circuit for the magnet 29, thus completing the driving connection for the spool 1, to move the tape 13 to such a position as would give the desired information, and preferably this would be done any suitable distance before actually reaching the particular place, thus giving the driver previous information or warning of the proper route to take. If there were considerable distance before the next turn for example a number of miles, the tape 13 would not move throughout such a period, because the continuously moving element would be provided with insulation which would pass between the roller contacts, and thus maintain an open circuit for the magnet 29. If it is desired to call the driver's attention to any particular points of interest along the route, such information may be arranged upon the tape 13, and an uninsulated portion of the wire so placed as to cause such a portion of the tape to become visible at the proper time. One of the advantages of providing a continuously movable master control means to cause a tape through a suitable mechanism to move intermittently, so that it is thus possible to obtain at certain periods, more complete and more detailed information from a large scale, map or sketch, than would be possible on a continuously movable tape. A further advantage, is that for a given distance, a tape of shorter length may be employed than would be possible with a continuously moving tape.

It is to be understood that for any given route, a certain master control roll and a tape corresponding thereto would be required.

By giving a preliminary warning upon the approach to a given road or land mark, it is apparent that slight inaccuracies which have been inherent in other indicators heretofore employed, which are due to slight variations in road contour, tire size and slippage, are reduced to a minimum.

While there has been shown certain practical embodiments of the invention, it is to be understood that certain changes and modifications may be made without departing from the spirit and scope of this invention.

Having thus described my invention, what I claim as new and desire to secure by Letters Patent, is:

1. A route indicator comprising a continuously movable member, a master control device actuated thereby including a plurality of spools rotatably mounted, and an element wound thereon, the said element having insulated portions distributed throughout the length thereof, a direction indicator including a tape having indicia bearing portions, and spools therefor, a driving means for the direction indicating means, and an electroresponsive clutch means governed by the master control mechanism, adapted to be shifted thereby for intermittently actuating the tape to visualize the indicia bearing portions successively.

2. In a route indicator for vehicles, a movable member having direction indicia bearing portions, mechanism for intermittently visualizing said portions successively, comprising a device operable by the vehicle when in motion, an adjustable driven device adapted to transmit motion from the driving device to the movable member, and control means for effecting adjustments of the driven device to respectively couple and uncouple the driving device and the movable member, said controlling means being operable by the driving device.

3. In a route indicator comprising a direction indicating mechanism, including a tape, a plurality of spools therefor, and a housing having an opening arranged adjacent to a portion of the tape whereby the same is visible therethrough, and a driving means for one of the spools, a master control device for intermittently moving the direction indicating means, the said control device including a plurality of spools, a continuous drive connection for one of said spools, a flexible element, wound upon one of the spools, the said elements having uninsulated portions arranged throughout the length thereof, an electroresponsive device, a circuit therefor, the said electroresponsive device being arranged to establish a driving connection for the direction indicating device, and a means arranged adjacent to the said element whereby as the uninsulated portions of the flexible element contact with said means, the circuit for the electroresponsive device is established.

4. A route indicator comprising a casing, having an opening in one side thereof, a direction indicating mechanism including a plurality of spools, a tape adapted to pass the said opening, the said tape being wound upon one spool, and having the end thereof connected to the other spool, a driving connection for one of the spools, an electroresponsive means for intermittently establishing a driving connection, and a master control device controlling the said electroresponsive means, the said control device including a plurality of spools rotatably mounted, means for continuously driving one of said spools, a conductor wound upon one of the spools and having one end connected to the other spool, the said conductor having spaced insulated portions distributed throughout the length thereof, and means connected in the circuit for the electroresponsive device, and arranged adjacent to the said conductor whereby the said electro-responsive device will be energized at different periods of time corresponding to those in which the uninsulated portion of the conductor is in contact with the said means.

5. A route indicator including a housing having a sight opening therethrough, a tape having direction indicating portions, a plurality of spools arranged within said housing at opposite sides of said sight opening and mechanism for transferring the tape from one spool to the other to intermittently visualize the direction indicating portions of said tape successively through said sight opening, said mechanism comprising a driving device operable by the vehicle when in motion, mechanically controlled adjustable means adapted when in one position to coact with one of the spools and the driving device transmitting motion to said spool, and controlling means for shifting the adjustable means, said controlling means being operable by the driving device.

EDWARD SIEGEL.